United States Patent Office.

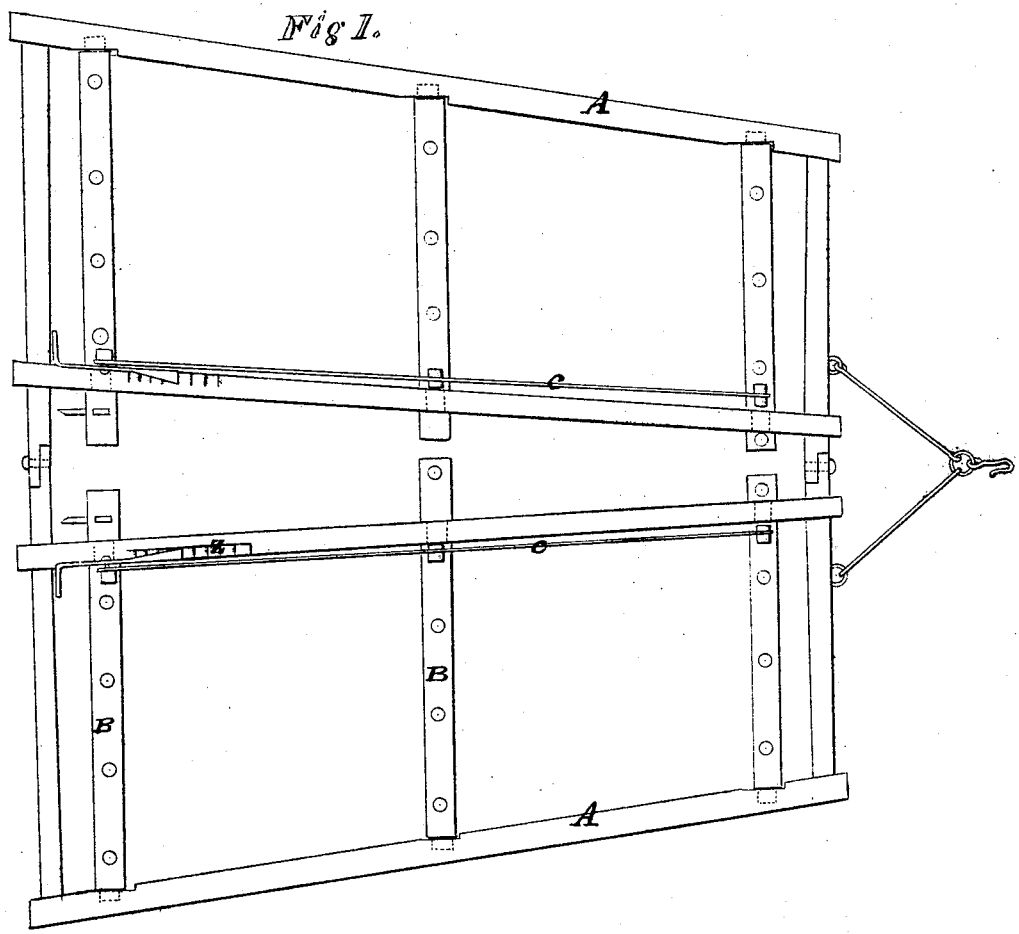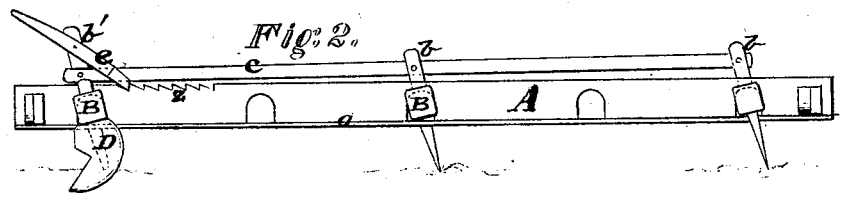

DAVID L. JAQUES, OF HUDSON, MICHIGAN.

Letters Patent No. 110,142, dated December 13, 1870.

IMPROVEMENT IN HARROWS.

The Schedule referred to in these Letters Patent and making part of the same.

*To all whom it may concern:*

Be it known that I, DAVID L. JAQUES, of Hudson, in the county of Lenawee and State of Michigan, have invented a new and valuable Improvement in Harrows; and I do hereby declare that the following is a full, clear, and exact description of the construction and operation of the same, reference being had to the annexed drawing making a part of this specification, and to the letters and figures of reference marked thereon.

Figure 1 of the drawing is a top view of my invention.

Figure 2 is a view of the inner side of one section of my harrow.

My invention relates to harrows; and consists mainly in the construction and novel arrangement of devices designed to guide the harrow with certainty, and to provide a means for adjusting all of the teeth of the harrow to any desired inclination.

The letter A of the drawing designates the harrow-frame, formed in two sections, pivoted together at each end.

B B represent the rotary adjustable bars, which bear the teeth of the harrow. These bars are formed with journals adapted to fit in seats made in the long side-bars of the frame, in such a manner that, while the outer ends of the bars have their journals working in circular mortises cut partly through the frame-bar, the inner journals are fitted into circular notches cut from the under sides of the inner frame-bars, and are kept in place by strips $a$ $a$, of metal, secured to the under side of the frame-bar.

At or near the inner ends of the adjustable rake-bars are fastened thereto the rigid arms $b$ $b$, which are pivoted to the long connecting-bars $c$ $c$ in such a manner that all of the rake-bars in each sectional harrow will be connected, and have the same angular position.

The arm $b'$, attached to the rear rake-bar, is made somewhat longer than the others, and pivoted to it is the pawl $e$, arranged to engage with a ratchet, $z$, on the upper surface of the frame-bar, thus securing the rake-bars in any desired position.

It is apparent that the inclination of the teeth of the harrow may in this manner be regulated at will to suit the nature of the soil. Or, when the teeth are operating, they may be inclined to the rear, thus facilitating its movement over grass or hard ground.

D represents a combined guide-blade and runner attached to the inner end of the rear rake-bar of each sectional harrow, and adapted, when the teeth thereof are set up, to strike into the ground deeply with its point, thereby serving to keep the harrow in a certain path and prevent swerving from side to side.

When the teeth are laid down to facilitate draft, the point of the guide D is turned to the rear, and it becomes a supporting runner for the harrow.

What I claim as my invention, and desire to secure by Letters Patent, is—

In a folding harrow, the arrangement of the transverse rotary tooth-bearing bars B, the connecting-bar $c$, pawl $e$, and ratchet $z$, and the combined runner and guide-blade D, substantially as shown and described.

In testimony that I claim the above, I have hereunto subscribed my name in the presence of two witnesses.

DAVID L. JAQUES.

Witnesses:
L. R. PEIRSON,
P. SHUMWAY.